United States Patent [19]

Dammeyer

[11] 4,072,886
[45] Feb. 7, 1978

[54] APPARATUS FOR REMOTE CONTROL OF ANTENNA ROTATORS

[75] Inventor: Ned E. Dammeyer, New Bremen, Ohio

[73] Assignee: Crown Controls Corporation, New Bremen, Ohio

[21] Appl. No.: 726,766

[22] Filed: Sept. 27, 1976

[51] Int. Cl.² .............................................. G05B 19/28
[52] U.S. Cl. .................................... 318/602; 318/470
[58] Field of Search ............... 318/602, 289, 466, 467, 318/468, 470, 16, 446; 307/141.4; 343/757, 758

[56] References Cited

U.S. PATENT DOCUMENTS

| | | | |
|---|---|---|---|
| 2,736,854 | 2/1956 | Will | 318/289 |
| 3,022,420 | 2/1962 | Brinkerhoff | 318/16 |
| 3,075,400 | 1/1963 | Carlson | 318/16 |
| 3,826,964 | 7/1974 | Byrne | 318/602 |

*Primary Examiner*—B. Dobeck
*Assistant Examiner*—John J. Feldhaus

[57] ABSTRACT

Apparatus for controlling the position of an antenna rotator from remote locations includes a sender unit which generates desired antenna position information and a control circuit associated with an antenna rotator. The sender includes a dial for selecting the desired antenna position, a control transmitter responsive to the position of the dial for providing an output at a first frequency containing the antenna position information and a holding circuit for continuing the output of the control transmitter until the antenna reaches the desired position. The sender also includes a receiver responsive to a signal at a second frequency from the control circuit for terminating the operation of the control transmitter. The antenna control circuit includes a receiver tuned to the first frequency to provide an electrical signal representative of desired antenna position; circuit means for comparing this signal to an electrical signal from the antenna rotator representative of the actual antenna position, and from these two signals, control signals are applied to the antenna rotator to cause it to rotate to the desired position; and a release transmitter for generating an output at the second frequency when the antenna rotator reaches its selected position. When a plurality of senders are used, each sender is provided with a circuit to inhibit any output from its control transmitter whenever another sender is in operation.

9 Claims, 6 Drawing Figures

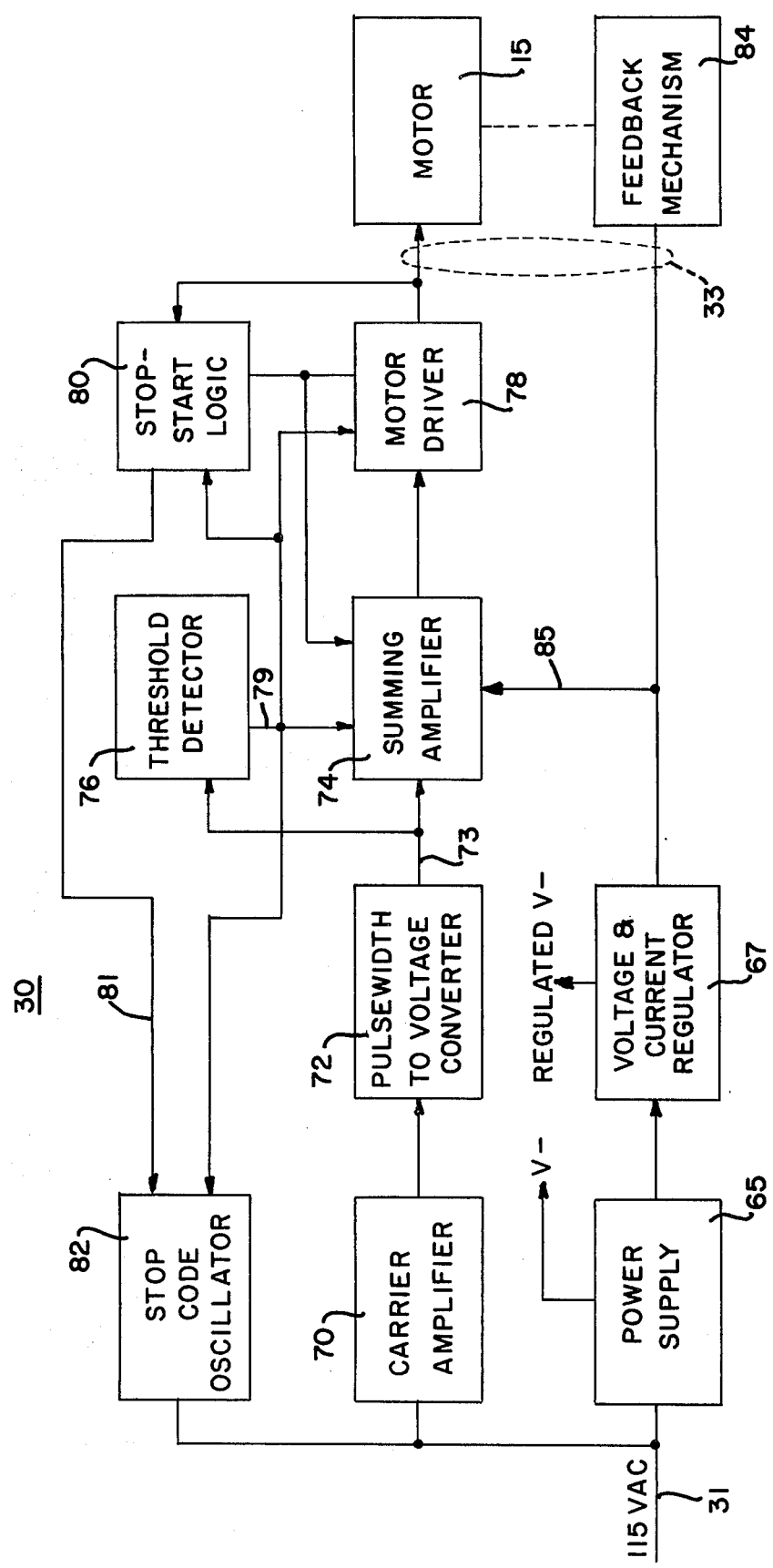

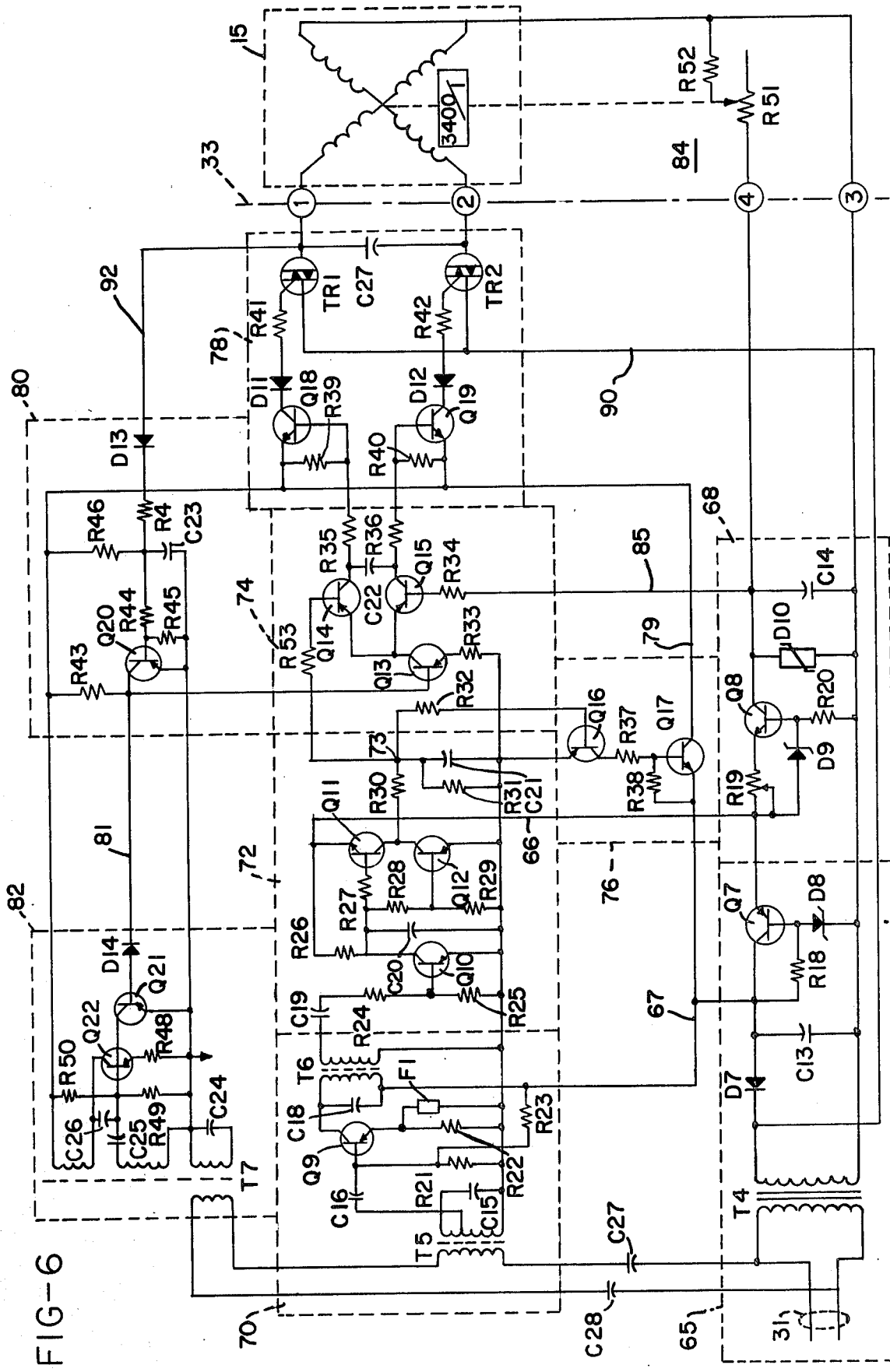

APPARATUS FOR REMOTE CONTROL OF ANTENNA ROTATORS

BACKGROUND OF THE INVENTION

This invention relates to a remote antenna rotator control apparatus.

It is frequently desirable, and sometimes necessary to have an outside directional antenna in order to receive adequate, high quality television, FM or other radio frequency signals. Such directional antennas may be provided with rotators having a rotator control preferably located near the receiver.

One antenna control system is shown in U.S. Pat No. 2,736,854. In that system, the antenna rotator control device is attached to a control cable which extends to the rotator, thus restricting the choice of installation locations. Also, a wired system does not lend itself readily to those installations where a plurality of receivers are serviced by a common antenna system and where it would be desirable to have an antenna control device associated with each receiver.

Remote control of the antenna from the viewers location, rather than from the television set is a desirable feature, and in one device to accomplish this purpose, shown in U.S. Pat. No. 3,508,274, a control unit provides acoustic or radio signals to cause a rotator motor to be rotated in response thereto. However, there is no provision in this device for preselecting a desired antenna position. While radio controlled devices to control motor position are available, these generally are expensive to construct and not well suited to the antenna rotator market.

SUMMARY OF THE INVENTION

This invention relates to an inexpensive remote antenna rotator control utilizing output signals from one or more senders to control the position of a remotely located antenna.

In a preferred embodiment of the invention, each sender is provided with a control transmitter for providing a first output signal, preferably a radio frequency signal at a first carrier frequency containing antenna position information as determined by an antenna position selecting knob. When the control transmitter is energized, this radio frequency information is transmitted, preferably by conduction through the alternating current house service, to an antenna rotator control circuit associated with and frequently located close to the antenna rotator and connected thereto by a four-conductor cable. A receiver within the control circuit senses the radio frequency output signal, the antenna position information carried thereby is compared with actual antenna position and the rotator is rotated to the preselected position. When the antenna arrives at the desired location, the control circuit generates a second signal, again preferably a radio frequency signal at a second carrier frequency, which is sensed by a receiver within the sender to terminate the operation of its control transmitter.

Since more than one television set or other receiver might be connected to a common antenna, the present invention allows a sender to be associated with each set thereby permitting control over the antenna position at whichever set is operable at any given time without requiring installation of antenna control cables.

In the preferred embodiment, each sender is provided with a circuit responsive to the output signals at a first frequency generated by other senders to prevent the operation of all other senders whenever one sender in the system is in operation thereby to prevent erroneous antenna position signals from being inadvertently generated.

The present invention permits a sender to be located anywhere within a room. By using the alternating current service to carry the radio frequency control signals to the antenna control unit, no control cables between the senders and the control circuit are needed.

Accordingly, it is an object of this invention to provide an apparatus for controlling from a remote location the position of an antenna rotator including a control unit comprising antenna position selecting means, control transmitter means responsive to said position selecting means for providing a first output signal containing the selected antenna position information, means for initiating the transmission of output signals from said control transmitter means, holding circuit means for continuing the output of said selected antenna position information from said control transmitter means, and first receiver means responsive to a second output signal for terminating the operation of said holding circuit means; and an antenna rotator control circuit associated with said antenna rotator and comprising second receiver means responsive to the first output signal of said control transmitter for providing an electrical signal representing the selected antenna position, means for comparing electrical signals representing the actual position of said antenna rotator with said electrical signal representing said selected position, means responsive to said comparing means for causing said antenna receiver to rotate to the selected position, and release transmitter means responsive to said antenna rotator reaching its selected location for producing a second output signal to terminate the operation of said holding circuit means.

It is a further object of the invention to provide a remote antenna rotator control of the type described which utilizes the alternating current service within a dwelling to conduct radio frequency signals containing antenna position information from a sender device to a remotely located antenna control circuit; and to provide a device of the type described wherein the antenna position information is in the form of pulse width modulation of the sender's radio frequency transmitter.

It is another object of this invention to provide an antenna rotator control wherein a plurality of senders, each of which may be associated with a separate set connected to a common antenna, may be used to control the position of an antenna rotator, and wherein the operation of one sender inhibits simultaneous operation of other senders within the system.

These and other objects and advantages of the invention will be apparent from the following description, the accompanying drawings and the appended claims.

BRIEF DESCRIPTION OF THE DRAWINGS

FIG. 5 is a block electrical diagram of the central receiver associated with the remotely located antenna rotator; and FIG. 6 is an electrical schematic diagram of the central receiver.

DESCRIPTION OF THE PREFERRED EMBODIMENT

Figure 1:
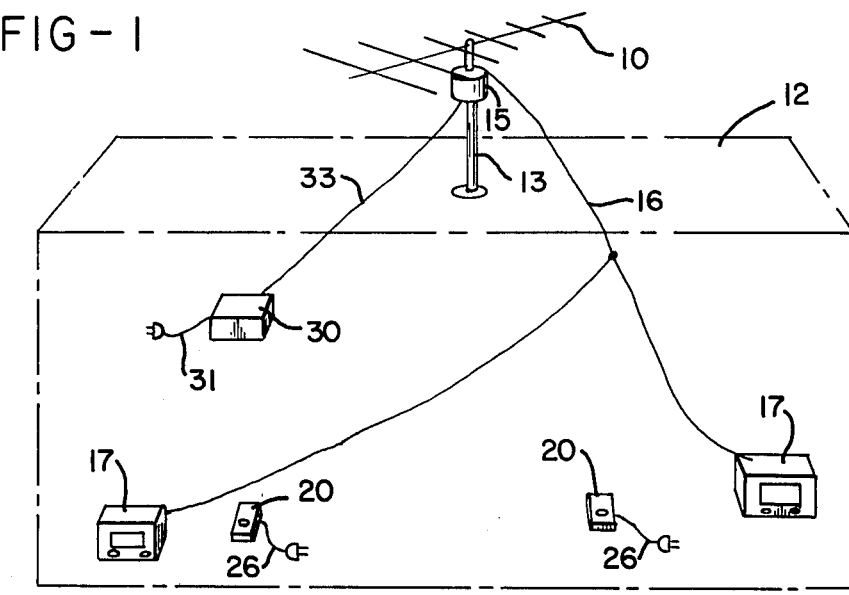
FIG. 1 is a schematic representation of a building including a roof mounted antenna for providing signals to a plurality of television receivers, a plurality of antenna control or sender units, and a rotator and associated central receiver for positioning the antenna.

Referring now to the drawings which show a preferred embodiment of the invention, and particularly to FIG. 1, an antenna 10 is shown mounted above a dwelling 12 on a mast 13, and the antenna position is controlled by an antenna rotator 15. The radio frequency signal from the antenna is carried by a cable 16 to a plurality of television or other types of receivers 17 located in different rooms of the dwelling.

Figure 2:
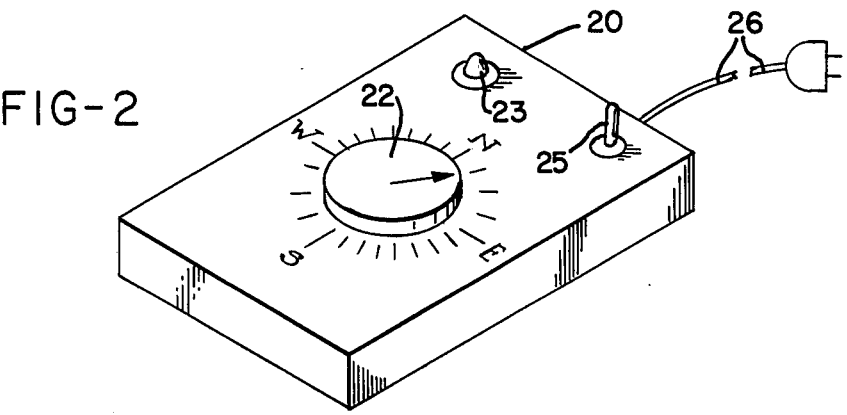
FIG. 2 is a pictorial view of an antenna control or sender unit.

Associated with, but not necessarily connected to, each television receiver is one or more antenna control units or senders 20, each of which, as shown in FIG. 2, includes an antenna position selector dial 22, a busy light 23 and a switch 25. In the preferred embodiment of the invention, each sender 30 is connected to a conveniently located alternating current (AC) wall outlet by means of cable 26. This cable is used to provide power to the sender and to carry radio frequency control signals from the sender to a remotely located antenna rotator control circuit or central receiver 30 associated with and usually located close to the antenna rotator 15. The central receiver 30 receives its power and control signals from the AC service within the dwelling through cable 31 and is connected to the antenna rotator 15 by means of a cable 33.

Figure 3:
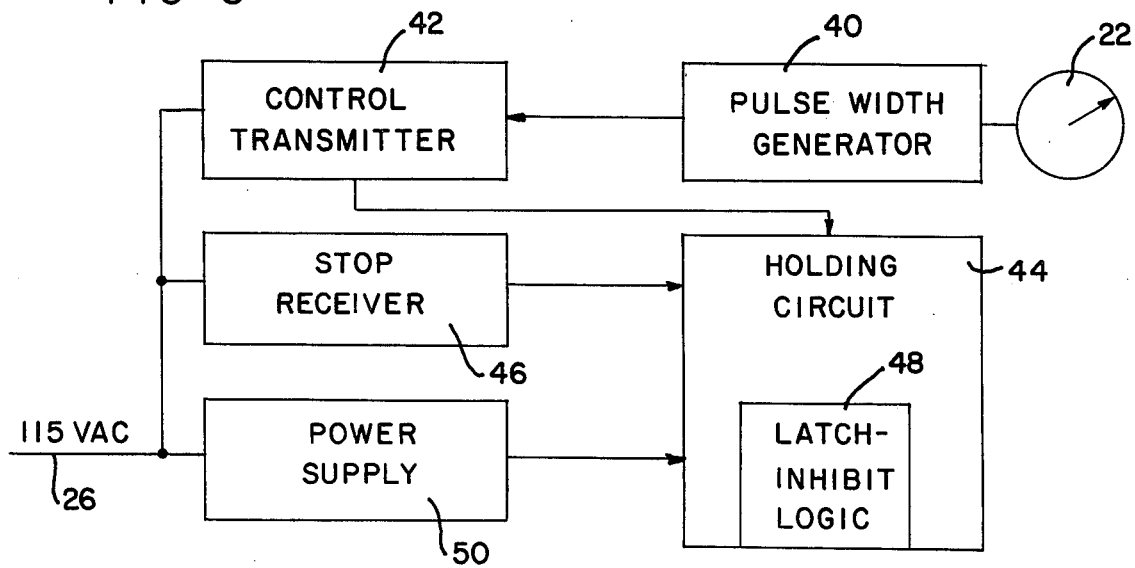
FIG. 3 is a block electrical diagram of an antenna control or sender for use in the antenna rotator system shown in FIG. 1.

Referring now to the block diagram of the control unit or sender 20 shown in FIG. 3, the antenna position selector dial 22 is connected to and control the output of a pulse width generator 40, which in turn modifies the first output signal of control transmitter 42 so that its output represents selected antenna position information. The radio frequency output of the control transmitter is coupled to the AC cable 26 and the selected antenna position information is carried as a radio frequency signal at a first carrier frequency to the central receiver 30 via the AC house wiring.

In the preferred embodiment described herein, the output of the transmitter 42 is initiated by switch 25; and the transmitter output is pulsed under control of the pulse width generator 40. The ratio of transmitter on to off time is therefore a function of the selected antenna position. It will be appreciated by those skilled in the art that other modulation techniques might be employed to achieve the same or similar result.

A holding circuit 44 will continue the output of the selected antenna position information from the control transmitter means 42 until the antenna reaches its desired position at which time a second output or stop signal, transmitted from the central receiver 30, is detected by a first or stop receiver 46, tuned to a second carrier frequency, to disable the holding circuit.

Each sender 20 includes means responsive to the output from other senders within the same system to inhibit that sender from generating an output therefrom; therefore only one sender can be operable at any given time. This function is shown by the block labeled Latch-Inhibit Logic 48 in FIG. 3. Finally, each sender includes a power supply 50 connected to the AC line 26 to provide the proper source of current to the components which comprise that unit.

Figure 4:
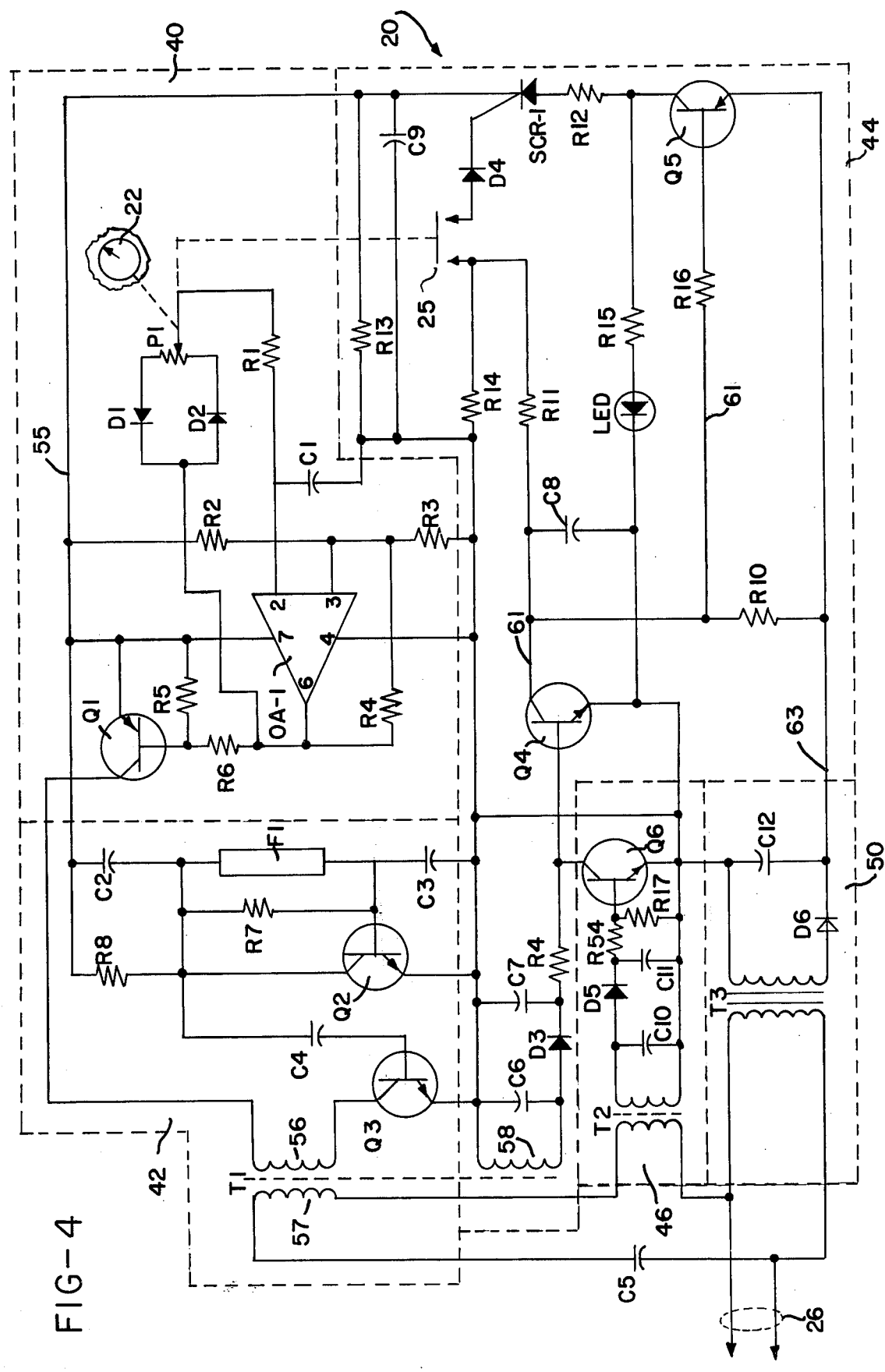
FIG. 4 is an electrical schematic diagram of the sender unit.

Referring now to the detailed electrical schematic in FIG. 4, the pulse width generator is shown generally at 40 and includes a potentiometer P1 mechanically connected to the antenna position selector dial 22 and electrically connected to operational amplifier OA-1 (Fairchild Model $\mu$A741) to control the symmetry of the pulse output from this device. The output of the operational amplifier is connected to transistor Q1 which acts as a switching device to control the source of current to the transmitter 42. The minimum pulse width of the oscillator is determined by resistor R1, and the pulse repetition rate is determined by R1, P1 and capacitor C1.

The control transmitter, shown generally at 42, comprises an oscillator, including transistor Q2, ceramic filter F1, capacitors C2, C3 and resistors R7 and R8, and an output transistor Q3. It will be noted that the transistor Q3 receives its power directly from line 55 while the power to the output transistor Q3 is controlled by transistor Q1 through the primary winding 56 of RF transformer T1. In the preferred embodiment of the invention, the oscillator is designed to operate in the 200 to 300 kHz range, with the exact frequency being determined by the filter F1.

The secondary winding 57 of the transformer T1 is connected through capacitor C5 to one side of the AC power line 26 and through the primary of the RF transformer T2, the function of which will be described later, to the other side of the power line.

The holding circuit 44 includes the secondary winding 58 of transformer T1, and this winding is connected in parallel with capacitor C6 to form a resonant circuit tuned to the output frequency of the control transmitter 42. A portion of the RF voltage developed in this circuit is rectified by diode D3 and applied to the base of transistor Q4 through resistor R9. A positive voltage on the base of transistor Q4 will cause this transistor to turn on, thus lowering the voltage on line 61 and gating transistor Q5 into the conducting state. Since Q4 is gated on only during the time an output is generated from the control transistor 42, an integrating capacitor C8 is provided to hold the voltage on line 61 low enough to permit Q5 to continue to conduct, even during the interval between RF pulses.

The stop receiver 46 includes an RF transformer T2, the secondary winding of which is connected in parallel to form a resonant circuit tuned to the frequency of the stop transmitter in the control circuit 30. This RF voltage is rectified by diode D5 and applied to the base of transistor Q6. Therefore, whenever a stop signal is received, transistor Q6 will be gated into conduction and will short or bypass to ground the base of transistor Q4.

The power supply 50 includes a power transformer T3, the output of which is rectified by diode D6 and filtered by capacitor C12. The output voltage on line 63 is approximately 24 volts.

Referring now to the block diagram for the antenna rotator control circuit or central receiver 30 shown in FIG. 5, and the schematic diagram of FIG. 6, this device includes a power supply 65 for providing both a regulated (line 66) and unregulated (line 67) direct current voltage to the remainder of the circuitry, and a constant current regulator 68 for providing a source of regulated current to a feedback mechanism, the operation of which will be later described. The receiver 30 also includes a carrier amplifier 70 tuned to sense the output at the first carrier frequency of the transmitter in each of the senders. The output of the carrier amplifier is an amplified RF signal which is applied to a pulse width to voltage converter 72; and the voltage output of this device on line 73 is therefore a function of the antenna position as determined by the position of the antenna position selector dial 22. This voltage is applied to both a summing amplifier 74 and a threshold detector 76.

The summing amplifier 74 has its output connected to a motor driver circuit 78 which supplies current to the windings of the antenna rotator motor 15. The threshold detector 76 circuit insures that it is an antenna positioning signal and not noise on the line 31 that is detected to initiate the operation of the device. The threshold detector has its output on line 79 connected to the summing amplifier 74, the motor driver circuit 78, a start-stop logic circuit 80 and a release transmitter or stop code oscillator circuit 82 to permit operation thereof only if an antenna positioning signal is preset.

A feedback mechanism 84 is associated with the motor 15 to indicate actual antenna position, and a signal from this device is applied as a second input or feedback signal to the summing amplifier 74. The analog voltage output of the pulse width converter circuit 72 on line 73 is compared against the voltage output of the feedback mechanism 84 on line 85 by the summing amplifier 74, and the output of the summing amplifier causes the motor to run in the direction which will reduce the difference in voltages until a balance condition exists, at which time the motor stops running.

The start-stop logic circuit 80 senses when the motor stops running and then applies an output signal on line 81 to the release transmitter or stop code oscillator 82 which then generates a second output signal, preferably an RF signal at a second carrier frequency. This RF signal is carried over the alternating current power line 31 to all of the senders 20 connected thereto. The stop code signal is detected by the stop receiver 46, as previously described, to terminate the operations of the holding circuit 44 and thus the oscillator 42. When the signal at the first RF frequency is thus terminated, this event is detected by the threshold detector 76, and the output of the stop code oscillator, as well as the operation of the summing amplifier 74, motor driver 78 and start-stop logic circuit 80 are thereafter disabled.

In the event that the motor 15 does not start to turn within a predetermined time limit, as determined by resistor R46 and capacitor C23, the start-stop logic circuit 80 will generate an output signal to the stop code oscillator 82 to terminate the output of the oscillator 42, thereby preventing continuous operation thereof even though the motor and antenna may not be at the desired position, but the motor, for whatever reason, is not provided with operating power.

To initiate operation of the system, switch 25 on the sender 20 is closed momentarily to supply current through diode D4 to the gate of SCR-1 from a voltage dividing network including resistors R10, R11 and R14. At the same time, the voltage on line 61 will be lowered sufficiently to gate transistor Q5 into the conducting state. Once Q5 conducts, the LED will be energized to indicate that the circuit is in operation. With voltage now present on line 55 through SCR-1, the oscillator 42 will begin operation, and a portion of its output signal will be received by the tuned circuit comprising winding 58 and capacitor C6 and rectified by diode D4 to gate transistor Q4 into the conducting state, thus holding the voltage on line 61 low.

The holding circuit 44 will also detect a radio frequency signal at the first carrier frequency generated by another sender unit connected to the same power line, and under these conditions, the circuit functions to inhibit operation of SCR-1 and thus to prevent power from being applied to the oscillator 42, as well as the pulse width generator 40, until a stop code signal at the second carrier frequency is generated. Thus, with transistor Q4 gated on, the voltage on line 61 is low enough to prevent a sufficient gate voltage from being applied to SCR-1. Transistor Q5 will conduct, however, and the LED will be energized to indicate a busy condition on the line even though its oscillator 42 is not functioning.

Accordingly, whenever one sender 20 in the system is operating, all other senders within that same system will be inhibited from operation, and closure of their respective switches 25 will not be effective to cause their transmitters to be turned on and generate confusing signals at the first carrier frequency.

As pointed out previously, a radio frequency signal at the first carrier frequency is applied to the AC power line through cable 26, and the ratio of on to off time of the carrier is representative of the desired antenna position as determined by the setting of dial 22 and potentiometer P1. It may be desirable to have switch 25 close automatically each time the antenna position selector dial 22 is rotated to a new position.

The radio frequency signal at the first carrier frequency and the antenna position information which modulates that carrier is carried by the AC service within the dwelling to the central receiver 30 shown in FIGS. 5 and 6 through its AC power cable 31 and through coupling capacitors C27 and C28 to the carrier amplifier circuit 70 which, in the embodiment shown, includes a class A amplifier comprising transistor Q9 and its associated components. This radio frequency signal is detected by transistor Q10 in the pulse width to voltage converter circuit 72 and the detected signal is then applied to transistors Q11 and Q12, the output of which is a square wave which is then integrated by capacitor C21. The voltage on line 73 is independent of the magnitude of the radio frequency signal and is dependent exclusively on the ratio of the on to off time of the radio frequency carrier. In other words, the voltage on line 73 is a function of desired antenna position.

Line 73 is connected to the base of transistor Q16 in the threshold circuit 76 which gates on transistor Q17 whenever a radio frequency carrier is detected to provide an unregulated direct current voltage on line 79 to the motor driver circuit 78, the start-stop logic circuit 80 and the stop code oscillator 82. In the embodiment of the invention described herein, the minimum on time for the oscillator 42 in each sender has been established to insure that the magnitude of the voltage on line 73 is sufficient to provide for proper operation of the central receiver.

The antenna position voltage on line 73 is also applied to the base of transistor Q14 in the summing amplifier 74. The voltage at the base of transistor Q15 represents actual antenna position and is derived from the feedback potentiometer R51. Transistors Q14 and Q15 comprise a differential amplifier, and only one of these transistors at any given time will provide a control signal to transistors Q18 or Q19 in the motor driver circuit 78. Transistors Q18 or Q19 in turn provide gating signals to triacs TR1 or TR2 to connect one of the windings of the motor 15 to the source of alternating current on line 90 to cause the antenna to rotate in a direction which will reduce the differences in voltages at the bases of transistors Q14 and Q15.

Transistor Q13 within the summing amplifier 74 functions as a constant current source for transistors Q14 and Q15. The base of transistor Q13 is connected to line 79 through resistor R43 and is therefore operable only when a radio frequency carrier at the first frequency has been detected. This transistor is also controlled by transistor Q20 in the start-stop logic circuit 80; and once the motor 15 has stopped rotating, transistor Q13 will shut off, and further control of the motor will be prevented until a new antenna position signal is received, as will be explained.

The base of transistor Q20 in the start-stop logic circuit 80 is biased to cut off initially by the action of capacitor C23, and is maintained in a nonconductive state as long as an alternating current voltage appears on line 92 to cause the motor 15 to rotate. With transistor Q20 biased off, transistor Q21 in the stop code oscillator circuit 82 will be biased on, and transistor Q22 will be biased off and this oscillator will generate no output signal. Also, the voltage to transistor Q13 in the summing amplifier 74 from line 79 through R43 will be unaffected and it will function as described above.

Whenever the motor 15 rotates the antenna to the desired position, triacs TR1 or TR2 will be gated off, the voltage will be removed from line 92, capacitor C23 will charge, and transistor Q20 will therafter be gated on with the following results: first, transistor Q13 will be gated off and no further control signals will be applied through the summing amplifier 74 and motor driver circuit 78 to the motor 15; and second, transistor Q21 in the stop code oscillator 82 will be gated off, transistor Q22 will be gated on and it will function as an oscillator to provide a radio frequency output (CW) at the second carrier frequency which will then be carried through capacitor C27 and C28 into the AC house service throughpower through power 31.

The radio frequency signal at the second carrier frequency will be detected by the stop receiver 46 in each sender unit 20, as shown in FIGS. 3 and 4. This signal will cause transistor Q6 to be gated on and thus cause the holding circuit to be disabled. In other words, Q4 will be gated off, Q5 will be gated off and SCR-1 will return to the nonconducting state thus terminating the operation of the oscillator 42.

Referring again to FIG. 6, when the RF carrier at the first frequency is terminated, the voltage on line 73 will decrease to zero, and the threshold circuit will remove the operating voltage on line 75 from the stop code oscillator 82 and thus terminate its operation. The stop code oscillator 82 is on for only a few milliseconds. At the same time, the operating voltage for the summing amplifier, motor driver and start-stop logic circuits will similarly be terminated. Thus, both the sender 20 and the central receiver 30 will have reverted to their initial condition.

The components used in a preferred embodiment of the invention are identified in the following tables.

TABLE I

FIG. 4

| Components | Description |
|---|---|
| PULSE WIDTH GENERATOR 40 | |
| C1 | .047 μfd |
| R1 | 200 ohm |
| R2 | 22K ohm |

TABLE I-continued

| | |
|---|---|
| R3 | 22K ohm |
| R4 | 4.7K ohm |
| R5 | 10K ohm |
| R6 | 10K ohm |
| D1 | 1N4148 |
| D2 | 1N4148 |
| P1 | 10K |
| Q1 | 2N3905 |
| OA-1 | μA741 |
| CONTROL TRANSMITTER 42 | |
| C2 | .001 μfd |
| C3 | .001 μfd |
| C4 | .001 μfd |
| C5 | .05 μfd |
| R7 | 680K ohm |
| R8 | 10K ohm |
| Q2 | 2N5172 |
| Q3 | 2N3416 |
| F1 | Ceramic Filter |
| T1 | RF Transformer |
| HOLDING CIRCUIT 44 | |
| C6 | .001 μfd |
| C7 | .001 μfd |
| C8 | .1 μfd |
| C9 | 100 μfd |
| R9 | 22K ohm |
| R10 | 22K ohm |
| R11 | 10K ohm |
| R12 | 100 ohm |
| R13 | 2.2K ohm |
| R14 | 470 ohm |
| R15 | 1K ohm |
| R16 | 10K ohm |
| D3 | 1N4148 |
| D4 | 1N4148 |
| LED | Light Emitting Diode |
| Q4 | 2N5172 |
| Q5 | 2N3905 |
| STOP RECEIVER 46 | |
| C10 | .0033 μfd |
| C11 | .01 μfd |
| R17 | 47K ohm |
| R54 | 4.7K ohm |
| D5 | 1N4148 |
| Q6 | 2N5172 |
| T2 | RF Transformer |
| POWER SUPPLY 50 | |
| C12 | 100 μfd, 25V |
| D6 | 1N4001 |
| T3 | Power Transformer |

TABLE II

FIG. 6

| Components | Description | | |
|---|---|---|---|
| POWER SUPPLY 65 | | | |
| C13 | 220 μfd, 35V | C27,28 | 0.05 μfd |
| R18 | 1K ohm | | |
| D7 | 1N4148 | | |
| D8 | 1N968, 20V | | |
| T4 | Power Transformer | | |
| Q7 | 2N3905 | | |
| CURRENT REGULATOR 67 | | | |
| C14 | 100 μfd, 16V | | |
| R19 | 1K ohm | | |
| R20 | 2.2K ohm | | |
| D9 | 1N957, 6.8V | | |
| D10 | MOV, Transient Suppressor | | |
| Q8 | 2N5172 | | |
| CARRIER AMPLIFIER 70 | | | |
| C15 | 470 pf | | |
| C16 | .001 μfd | | |
| F1 | Ceramic Filter | | |
| C18 | .001 μfd | | |
| R21 | 1K ohm | | |
| R22 | 1K ohm | | |
| R23 | 10K ohm | | |
| T5 | IF Transformer | | |
| T6 | IF Transformer | | |
| Q9 | 2N3638A | | |
| PULSE WIDTH VOLTAGE CONVERTER 72 | | | |
| C19 | .01 μfd | | |
| C20 | .0033 μfd | | |
| C21 | 5 μfd, 16V | | |
| R24 | 4.7K ohm | | |
| R25 | 470 ohm | | |
| R26 | 4.7K ohm | | |
| R27 | 22K ohm | | |
| R28 | 47K ohm | | |

TABLE II-continued

| | |
|---|---|
| R29 | 10K ohm |
| R30 | 2.2K ohm |
| R31 | 4.7K ohm |
| Q10 | 2N3638A |
| Q11 | 2N5172 |
| Q12 | 2N3638A |
| SUMMING AMPLIFIER 74 | |
| C22 | .047 μfd |
| R32 | 22K ohm |
| R33 | 620 ohm |
| R34 | 22K ohm |
| R35 | 10K ohm |
| R36 | 10K ohm |
| R53 | 22K ohm |
| Q13 | 2N3638A |
| Q14 | 2N3638A |
| Q15 | 2N3638A |
| THRESHOLD CIRCUIT 76 | |
| R37 | 10K ohm |
| R38 | 4.7K ohm |
| Q16 | 2N3638A |
| Q17 | 2N3704 |
| MOTOR DRIVER 78 | |
| C27 | 65 μfd |
| R39 | 1K ohm |
| R40 | 1K ohm |
| R41 | 470 ohm |
| R42 | 470 ohm |
| D11 | 1N4148 |
| D12 | 1N4148 |
| Q18 | 2N3416 |
| Q19 | 2N3416 |
| TR1 | 2N6070A |
| TR2 | 2N6070A |
| START-STOP LOGIC 80 | |
| C23 | 25 μfd, 16V |
| R43 | 22K ohm |
| R44 | 10K ohm |
| R45 | 1K ohm |
| R46 | 15K ohm |
| R47 | 22K ohm |
| D13 | 1N4148 |
| Q20 | 2N3638A |
| STOP CODE OSCILLATOR 82 | |
| C24 | .0033 μfd |
| C25 | .01 μfd |
| C26 | 470 pf |
| R48 | 22K ohm |
| R49 | 2.2K ohm |
| R50 | 47K ohm |
| D14 | 1N4148 |
| Q21 | 2N3638A |
| Q22 | 2N3906 |
| T7 | RF Transformer |
| FEEDBACK MECHANISM 84 | |
| R51 | 1K ohm |
| R52 | 120 ohm |

While the apparatus described above utilizes conducted radio frequency signals to control an antenna rotator, it should be understood that wireless radio frequency signals or acoustical signals could also be used with appropriate modifications to the circuits previously described.

While the form of apparatus herein described constitutes preferred embodiments of this invention, it is to be understood that the invention is not limited to this precise form of apparatus, and that changes may be made therein without departing from the scope of the invention which is defined in the appended claims.

What is claimed is:

1. Apparatus for controlling from a remote location the position of an antenna rotator including
   a control unit comprising
      antenna position selecting means,
      control transmitter means responsive to said position selecting means for providing a first output signal containing the selected antenna position information,
      means for initiating the transmission of output signals from said control transmitter means,
      holding circuit means for continuing the output of said selected antenna position information from said control transmitter means, and
      first receiver means responsive to a second output signal for terminating the operation of said holding circuit means;
   and an antenna rotator control circuit associated with said antenna rotator and comprising
      second receiver means responsive to the first output signal of said control transmitter for providing an electrical signal representing the selected antenna position,
      means for comparing electrical signals representing the actual position of said antenna rotator with said electrical signal representing said selected position,
      means responsive to said comparing means for causing said antenna rotator to rotate to the selected position, and
      release transmitter means responsive to said antenna rotator reaching its selected location for producing a second output signal to terminate the operation of said holding circuit means.

2. The apparatus of claim 1 wherein said control unit and said antenna rotator control circuit are electrically connected to an alternating current service within a dwelling and wherein said first and second output signals are radio frequency signals at first and second frequencies carried by said alternating current service.

3. The apparatus of claim 1 wherein said control transmitter means includes a pulse width modulator responsive to the antenna position selecting means whereby the ratio of the on to off time of the first output signal is a function of desired antenna position.

4. The apparatus of claim 1 wherein said means for initiating the operation of said control transmitter is a switch which is momentarily operated independently of said antenna position selecting means.

5. The apparatus of claim 1 wherein said holding circuit means includes means responsive to said first output signal to continue operation of said control transmitter means once said operation is commenced.

6. The apparatus of claim 1 further including means responsive to said first output signal for preventing the initiation of the transmission of an output signal from said control transmitter means.

7. The apparatus of claim 1 further including means responsive to the presence of a first output signal for indicating visually that said antenna rotator is in motion.

8. Apparatus for controlling from a remote location the position of an antenna rotator including
   a plurality of control units each comprising
      antenna position selecting means,
      control transmitter means responsive to said position selecting means for providing a radio frequency output signal at a first carrier frequency containing the selected antenna position information,
      means for initiating the transmission of output signals from said control transmitter means,
      holding circuit means for continuing the output of said selected antenna position information from said control transmitter means,
      means responsive to signals at said first carrier frequency to inhibit the operation of said control transmitter means whereby only one of said control units is operable at any given time, and first receiver means responsive to radio frequency signals at a second carrier frequency for terminating the operation of said holding circuit means, and an antenna rotator control circuit associated with said antenna rotator and comprising second receiver means responsive to the output signals of said control transmitter carrier to provide an output signal representing the selected antenna position, means for comparing the actual position of said antenna rotator with said selected position signal, means responsive to said comparing means for causing said antenna rotator to rotate to the selected position, and release transmitter means responsive to said antenna rotator reaching its selected location for producing radio frequency output signals at said second carrier frequency to terminate the operation of said holding circuit means.

9. The apparatus of claim 8 further including means indicating the existence of an output signal at said first carrier frequency for providing the operator with a visual indication when said antenna rotator is in motion.

* * * * *